US008931332B2

(12) United States Patent
Suzuki et al.

(10) Patent No.: US 8,931,332 B2
(45) Date of Patent: Jan. 13, 2015

(54) ENGINE STROKE DETERMINATION APPARATUS

(71) Applicant: Fuji Jukogyo Kabushiki Kaisha, Tokyo (JP)

(72) Inventors: Toshiyuki Suzuki, Tokyo (JP); Hirofumi Kawauchi, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/030,468

(22) Filed: Sep. 18, 2013

(65) Prior Publication Data

US 2014/0090459 A1 Apr. 3, 2014

(30) Foreign Application Priority Data

Sep. 28, 2012 (JP) ................................ 2012-216223

(51) Int. Cl.

*G01M 15/06* (2006.01)
*F02P 17/00* (2006.01)
*F02D 41/00* (2006.01)
*F02P 17/12* (2006.01)

(52) U.S. Cl.

CPC ............... *F02P 17/00* (2013.01); *F02D 41/009* (2013.01); *F02P 17/12* (2013.01); *F02D 2041/0092* (2013.01); *F02P 2017/121* (2013.01)

USPC ........................................................ 73/114.27

(58) Field of Classification Search

CPC ...................................................... G01M 15/06
USPC ................ 73/114.26, 114.27, 114.28, 114.29
See application file for complete search history.

(56) References Cited

U.S. PATENT DOCUMENTS

| | | | | |
|---|---|---|---|---|
| 5,402,675 | A * | 4/1995 | Entenmann et al. | 73/114.07 |
| 7,007,668 | B2 * | 3/2006 | Okochi | 123/406.52 |
| 7,886,584 | B2 * | 2/2011 | Machida et al. | 73/114.27 |
| 2006/0218998 | A1 * | 10/2006 | Machida et al. | 73/117.3 |
| 2009/0158832 | A1 * | 6/2009 | Machida et al. | 73/114.27 |

FOREIGN PATENT DOCUMENTS

| | | | |
|---|---|---|---|
| JP | 03-134247 | A | 6/1991 |
| JP | 2002-054493 | A | 2/2002 |
| JP | 2009-236036 | A | 10/2009 |

* cited by examiner

*Primary Examiner* — Eric S McCall
(74) *Attorney, Agent, or Firm* — McDermott Will & Emery LLP

(57) ABSTRACT

There is provided an engine stroke determination apparatus. The engine stroke determination apparatus is for determining stroke of a single-cylinder four-stroke engine and includes a transistor igniter. The apparatus is configured to determine a compression stroke and an exhaust stroke by comparing voltages of ignition signals that are output in the compression stroke and the exhaust stroke by the transistor igniter.

2 Claims, 2 Drawing Sheets

ENGINE STROKE DETERMINATION APPARATUS

CROSS-REFERENCE TO RELATED APPLICATIONS

The present application claims priority from Japanese Patent Application No. 2012-216223 filed on Sep. 28, 2012, the entire contents of which are hereby incorporated by reference.

BACKGROUND

1. Technical Field

The present invention relates to engine stroke determination apparatuses, and more particularly, to an engine stroke determination apparatus capable of making a determination with a high degree of accuracy using a simple configuration.

2. Related Art

A four-stroke general purpose engine used in industrial field is requested to determine a stroke for the purpose of improving fuel efficiency and emission performance thereby not performing ignition in an exhaust stroke (wasteful ignition) to prevent after-burns in which unburned fuel is burned in an exhaust system and performing fuel injection only in an intake stroke instead of performing so-called fuel injection in every stroke.

For example, Japanese Unexamined Patent Application Publication (JP-A) No. 2009-236036 discloses a conventional technique relating to such engine stroke determination. Specifically, a pulse generation unit is provided to generate a pulse signal in accordance with the rotation of a crank shaft, and a duration of a pulse interval is measured with a microcomputer, whereby a compression stroke and an exhaust stroke are determined.

In addition, JP-A No. 2002-54493 indicates a technique in which a stroke is determined by measuring a discharge time of an ignition coil of a transistor ignition device.

However, in the technique described in JP-A No. 2009-236036, it is necessary to provide the pulse generation unit in the engine, which increases the number of components and makes the structure complicated.

In the technique described in JP-A No. 2002-54493, it is necessary to provide a timer function in the microcomputer to measure the discharge time of the ignition coil accurately, which makes the configuration of the apparatus complicated. In addition, it is necessary to set a strict threshold value of the discharge time for the determination: if the threshold value is inappropriate, the determination may be made falsely.

BRIEF SUMMARY OF THE INVENTION

The present invention has been designed in consideration of the circumstances described above, and an object thereof is to provide an engine stroke determination apparatus capable of making a determination with a high degree of accuracy with a simple configuration.

An aspect of the present invention provides an engine stroke determination apparatus for determining a stroke of a single-cylinder four-stroke engine. The engine stroke determination apparatus includes a transistor igniter. The engine stroke determination apparatus determines a compression stroke and an exhaust stroke by comparing voltages of ignition signals that are output in the compression stroke and the exhaust stroke by the transistor igniter.

The engine stroke determination apparatus may include a determination circuit that generates a different number of pulses in accordance with the voltage of the ignition signal.

DETAILED DESCRIPTION

The present invention has accomplished the object of providing an engine stroke determination apparatus capable of making a determination with a high degree of accuracy with a simple configuration by comparing voltages of ignition signals which are output in a compression stroke and an exhaust stroke by the transistor igniter and by using a determination circuit that generates a different number of pulses in accordance with the voltage difference.

The engine rotation speed is not constant and is different according to the stroke, and in the exhaust stroke immediately after the combustion stroke, the engine rotation speed is relatively high. Thereafter, the intake stroke is done by inertia, and further, in the compression stroke with the task of compressing new air, the speed is relatively low.

A voltage waveform of the ignition signal which is output by the transistor igniter is changed in accordance with the difference of the rotation speed, and therefore, in the present invention, the engine exhaust stroke and the compression stroke can be determined with a high degree of accuracy with a simple configuration by comparing the voltage of the ignition signal.

According to this configuration, by counting the number of pulses which are output by the circuit, the stroke determination can be made in a simple and reliable manner.

Example

An example of an engine stroke determination apparatus according to the present invention will be described below.

The stroke determination apparatus according to this example is a single-cylinder four-stroke engine used for industrial, leisure, and gardening purposes.

This engine has a transistor igniter that transmits an ignition signal to an ignition plug in a combustion chamber.

Figure 1:
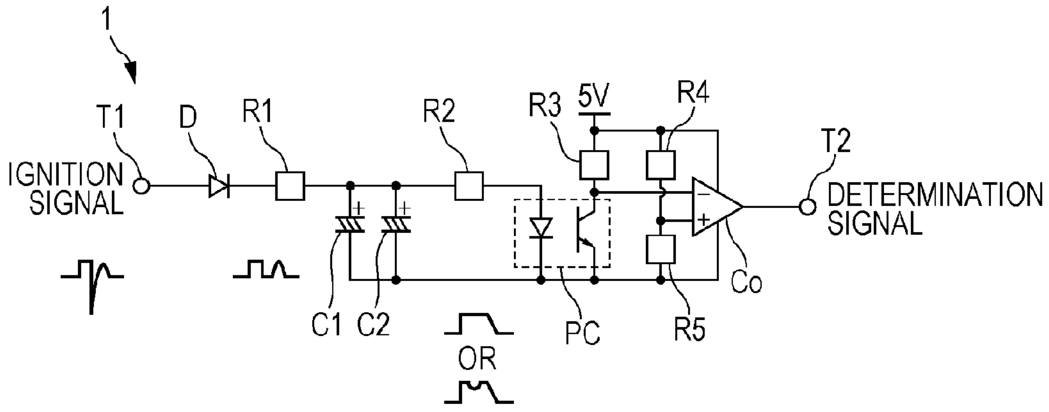
FIG. 1 is a circuit diagram illustrating an engine stroke determination apparatus to according to the present invention.

FIG. 1 is a circuit diagram illustrating an example of the engine stroke determination apparatus according to the example.

FIG. 1 also illustrates examples of ignition signal waveforms in respective processing stage.

As illustrated in FIG. 1, a stroke determination apparatus 1 is configured by connecting an input terminal T1, an output terminal T2, a diode D, capacitors C1 and C2, resistors R1, R2, R3, R4 and R5, a photo-coupler PC, a comparator Co, and a power supply of, for instance, direct current of 5V.

The ignition signal which is input from the input terminal T1 is rectified by the diode D, and passes the resistor R1. Then, the signal is charged to the capacitors C1 and C2 are charged, whereby it is smoothed.

Thereafter, the ignition signal passes the resistor R2, and is input into the photo-coupler PC.

An output of the photo-coupler PC is transmitted to the 5V power supply via the resistor R3, and then input into an inverting input (V−) terminal of the comparator Co.

A non-inverting input (V+) terminal of the comparator Co is connected to an intermediate point between the resistor R4 and the resistor R5 connected successively in series to the 5V power supply.

Figure 2:
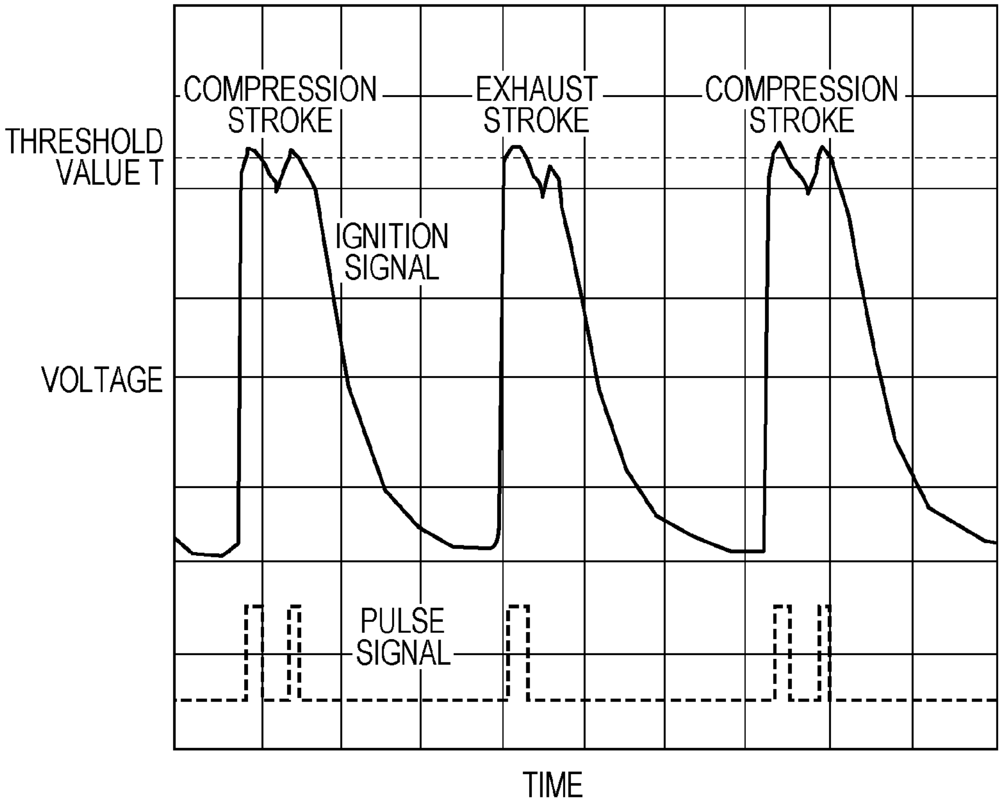
FIG. 2 is a graph illustrating a waveform of an ignition signal and a determination pulse signal which are output by a transistor igniter.

FIG. 2 is a graph illustrating a waveform of an ignition signal and a determination pulse signal which are output by a transistor igniter.

In FIG. 2, the horizontal axis denotes the time, and the vertical axis denotes the voltage.

As illustrated in FIG. 2, the ignition signal is output at each of the compression stroke and the exhaust stroke. At each stroke, the voltage of the input signal once drops after the first peak, and then, the voltage increases again, which makes a spike-like waveform.

The stroke determination apparatus of the example makes a stroke determination on the basis of the voltage at the second peak of the spike waveform.

Since engine rotation speeds in the exhaust stroke and the compression stroke are different, as illustrated in FIG. 2, the second peak thereof have different waveforms.

At this time, if an appropriate threshold value T is provided, whether the stroke is the exhaust stroke or the compression stroke can be determined on the basis of the number of times the voltage exceeds the threshold value T.

Specifically, a threshold value T is set such that, as illustrated in FIG. 2, the voltage in the compression stroke exceeds the threshold value T twice the voltage in the exhaust stroke exceeds the threshold value T once, and the capacity of each of the capacitors C1 and C2 of the circuit in FIG. 1 and the resistance of each resistor R1 to R5 is set appropriately in accordance with such threshold value. As a result, the pulse-like determination signal is output from the output terminal T2 only when the voltage becomes more than the threshold value T.

As illustrated in FIG. 1, in the compression stroke, the upper portion of the signal waveform which is input into the comparator Co is lost (recessed), and at this occasion the comparator Co is adjusted to output two pulses.

In the exhaust stroke, on the other hand, upper portion of the signal waveform which is input into the comparator Co is flat, and at this occasion, the comparator Co is adjusted to output one pulse.

By providing a microcomputer or the like to count the number of pulses which are output from the output terminal T2, the compression stroke (the number of pulses=2) and the exhaust stroke (the number of pulses=1) can be determined.

When such stroke determination can be once satisfied in, for instance, a predetermined rotation speed region after the engine is started, it is not necessary to perform determination thereafter.

As described above, according to the present example, the difference of the voltage waveforms of the ignition signals between the compression stroke and the exhaust stroke is used to configure the determination circuit so as to output different numbers of pulses in the compression stroke and in the exhaust stroke. In so doing, the stroke determination can be made with a high degree of accuracy with a simple configuration without using any microcomputer and the like having a timer function and without providing a sensor for the stroke determination.

By performing such stroke determination, so-called wasteful ignition is eliminated, and afterburn can be prevented.

In addition, in fuel injection, it is not necessary to perform injection on every stroke, whereby, the fuel efficiency and the engine efficiency can be improved.

(Modification)

The present invention is not limited to the example described above. Various modifications and changes can be implemented, which are also within the technical scope of the present invention.

For instance, the circuit configuration is not limited to the above example, and a specific circuit configuration for determining the stroke on the basis of the voltage of the ignition signal can be changed as appropriate.

The invention claimed is:

1. An engine stroke determination apparatus for determining a stroke of a single-cylinder four-stroke engine, the engine stroke determination apparatus comprising a transistor igniter, wherein the engine stroke determination apparatus determines whether an engine stroke is a compression stroke or an exhaust stroke based on a change in a number of an event or events in which a voltage of an ignition signal that is output in the compression stroke and the exhaust stroke by the transistor igniter exceeds a threshold value due to a change in a rotation speed of the engine.

2. The engine stroke determination apparatus according to claim 1, comprising a determination circuit to generate a different number of pulses in accordance with the voltage of the ignition signal.

* * * * *